United States Patent
Mocek et al.

[11] Patent Number: 5,924,089
[45] Date of Patent: *Jul. 13, 1999

[54] NATURAL LANGUAGE TRANSLATION OF AN SQL QUERY

[75] Inventors: Darryl Jon Mocek, San Jose; Kester Li; Jonathan Michael Levine, both of San Francisco, all of Calif.

[73] Assignee: International Business Machines Corporation, Armonk, N.Y.

[ * ] Notice: This patent is subject to a terminal disclaimer.

[21] Appl. No.: 08/707,139

[22] Filed: Sep. 3, 1996

[51] Int. Cl.⁶ .................................................. G06F 17/30
[52] U.S. Cl. .................. 707/4; 707/1; 707/4; 707/5; 707/9; 707/10; 707/100; 707/101; 707/102; 704/1; 704/4; 704/9; 395/701
[58] Field of Search ...................... 707/4, 5, 1; 364/419, 364/419.01, 419.08, 275.4, 283.3, 974.6; 345/326, 359; 704/1, 4, 9; 395/701

[56] References Cited

U.S. PATENT DOCUMENTS

| | | | |
|---|---|---|---|
| 4,930,071 | 5/1990 | Tou et al. | 704/1 |
| 5,157,783 | 10/1992 | Anderson et al. | 707/4 |
| 5,197,005 | 3/1993 | Shwartz et al. | 704/1 |
| 5,237,502 | 8/1993 | White et al. | 704/1 |
| 5,265,014 | 11/1993 | Haddock et al. | 704/1 |
| 5,265,065 | 11/1993 | Turtle | 707/3 |
| 5,323,311 | 6/1994 | Fukao et al. | 704/2 |
| 5,386,556 | 1/1995 | Hedin et al. | 707/5 |
| 5,412,804 | 5/1995 | Krishna | 707/2 |
| 5,442,780 | 8/1995 | Takanashi et al. | 707/1 |
| 5,446,842 | 8/1995 | Schaeffer et al. | 395/200.35 |
| 5,471,611 | 11/1995 | Mcgregor | 707/4 |
| 5,519,862 | 5/1996 | Schaeffer et al. | 395/701 |
| 5,548,755 | 8/1996 | Leung et al. | 707/2 |
| 5,555,169 | 9/1996 | Namba et al. | 704/9 |
| 5,555,367 | 9/1996 | Premeriani et al. | 707/4 |
| 5,557,791 | 9/1996 | Cheng et al. | 707/2 |
| 5,579,223 | 11/1996 | Suryanarayama | 704/1 |
| 5,583,982 | 12/1996 | Matheny et al. | 345/326 |
| 5,584,024 | 12/1996 | Shwartz | 707/4 |
| 5,615,367 | 3/1997 | Bennett et al. | 707/102 |
| 5,623,591 | 4/1997 | Cseri | 345/326 |
| 5,680,603 | 10/1997 | Bhargava et al. | 707/2 |
| 5,684,999 | 11/1997 | Okamoto et al. | 704/9 |
| 5,742,827 | 4/1998 | Ohkubo et al. | 395/701 |

*Primary Examiner*—Paul V. Kulik
*Assistant Examiner*—Jean M. Corrielus
*Attorney, Agent, or Firm*—Merchant, Gould, Smith, Edell, Welter & Schmidt

[57] ABSTRACT

A method, apparatus, and article of manufacture which provides for the display of database management information on a computer in a user-friendly way to minimize errors and maximize database usership. The invention displays a window in a graphical user interface on a computer display. The window allows the user to enter database tables, fields, and database commands selected from a displayed menu. The window also displays a natural language translation of the current status of the database command, allowing the user to see, in real time, the scope of the request and the databases affected.

24 Claims, 17 Drawing Sheets

NATURAL LANGUAGE TRANSLATION OF AN SQL QUERY

CROSS-REFERENCE TO RELATED APPLICATION

This application is related to the following and commonly-assigned patent applications:

application Ser. No. 08/708,117, now U.S. Pat. No. 5,787,418 entitled "FIND ASSISTANT FOR CREATING DATABASE QUERIES," filed on same date herewith, by Michael R. Hibbetts et al., and application Ser. No. 08/707,140, now U.S. Pat. No. 5,842,209 entitled "USER INTERFACE FOR VISUALLY DEPICTING INNER/OUTER/LEFT/RIGHT JOINS IN A DATABASE SYSTEM," filed on same date herewith, by Darryl J. Mocek et al., both of which applications are incorporated by reference herein.

BACKGROUND OF THE INVENTION

1. Field of the Invention

This invention relates generally to methods of accessing information stored in a database management system (DBMS), and in particular to a computer-implemented user interface providing a natural language translation of DBMS queries.

2. Description of Related Art

Large-scale integrated database management systems provide an efficient, consistent, and secure means for storing and retrieving vast amounts of data. This ability to manage massive amounts of information is a virtual necessity in business today.

Relational Database Management Systems (RDBMS) software using Structured Query Language (SQL) interfaces are well known in the art. The SQL interface has evolved into a standard language for RDBMS software and has been adopted as such by both the American National Standards Institute (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

Unfortunately, while powerful, the SQL interface can be difficult to use, especially for laypersons with little or no experience with databases or computers. This problem limits the application of RDBMS technology to provide business information, often to those who need it the most. Potential RDBMS users often fail to avail themselves to the benefits of RDBMS technology because they are either intimidated by or reluctant to learn new technology. Even if they are willing to learn, expensive and lengthy training may be required before these potential users achieve a basic functional capability. SQL's idiosyncrasies also have other negative consequences. For example, both novice and experienced SQL users often formulate improper SQL commands, and obtain search results which fail to disclose critical data or require the DBMS to search through more data than is required, lengthening the search, and placing unnecessary demands on DBMS processing.

SUMMARY OF THE INVENTION

To overcome the limitations in the prior art described above, and to overcome other limitations that will become apparent upon reading and understanding the present specification, the present invention discloses a method, apparatus, and article of manufacture for displaying database management information on a computer. The method comprises the steps of displaying a window on a computer display device, accepting a user-selected database command from a user input device coupled to the computer, interpreting the user-selected database command to produce a natural language translation of the command, and presenting the natural language translation of the command to the user on the display device. In an exemplary embodiment presented herein, the information displayed to the user includes a database table box having a list of database tables, an associated database field box having a list of database fields associated with the database tables, a relational condition box, and a search string edit box, in which the user may enter a combination of search strings and logical relationships between the search strings.

The present invention therefore presents the user with a list of selectable database tables, and fields associated with those tables, a box to enter search strings, and a list of selectable relational conditions to apply to the database fields and search strings. The present invention interprets the user-selected values for these items, and presents, on the same screen, a natural language translation of the database command. As a result, the user can read a plain language description of the current database command while the information is entered, and before the search command is transmitted to the relational database management system. This averts potential database command errors and the resulting processing delays, while at the same time, encouraging novice users to use the RDBMS, and to experiment with different SQL queries.

The present invention also provides full SQL functionality by allowing the user to construct search strings with logical relationships between search parameters and to create complex SQL commands by linking simpler SQL commands with logical conditional operators.

BRIEF DESCRIPTION OF THE DRAWINGS

Referring now to the drawings in which like reference numbers represent corresponding parts throughout:

FIGS. 3A–3L are diagrams illustrating exemplary embodiments of the user interface provided by the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
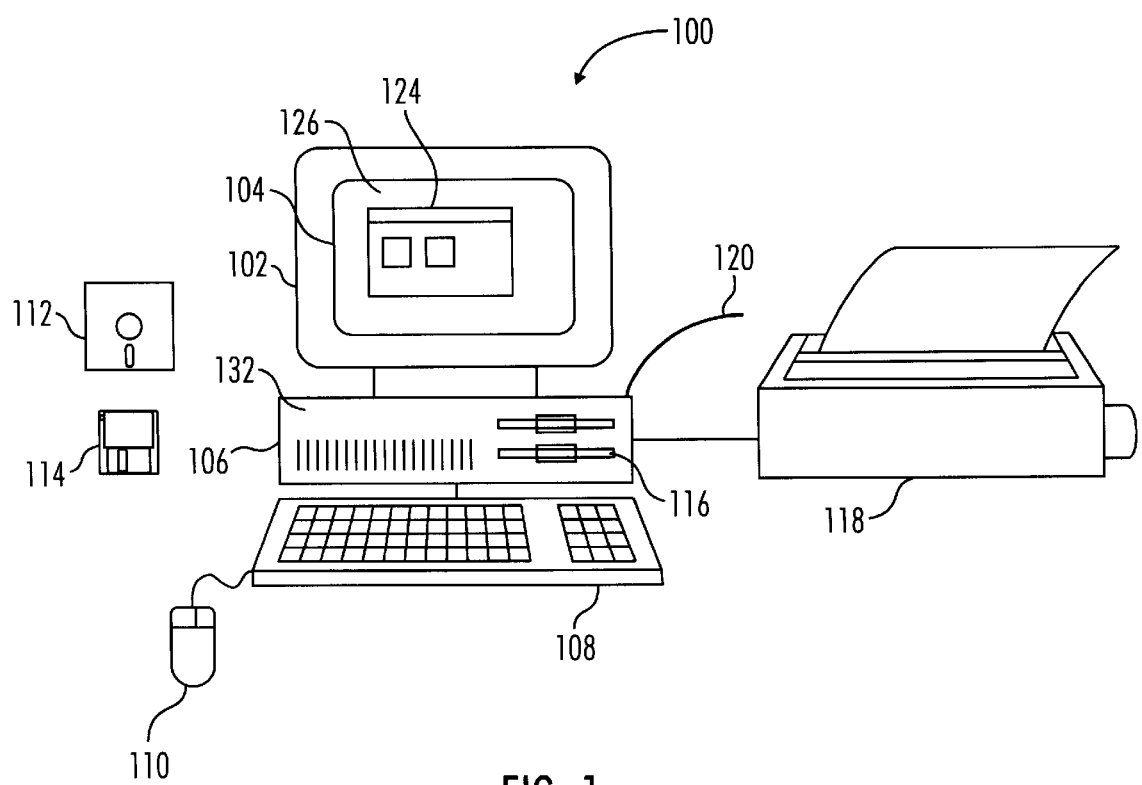
FIGS. 1 and 2 illustrate an exemplary computer hardware environment that could be used with the present invention.
Figure 2:
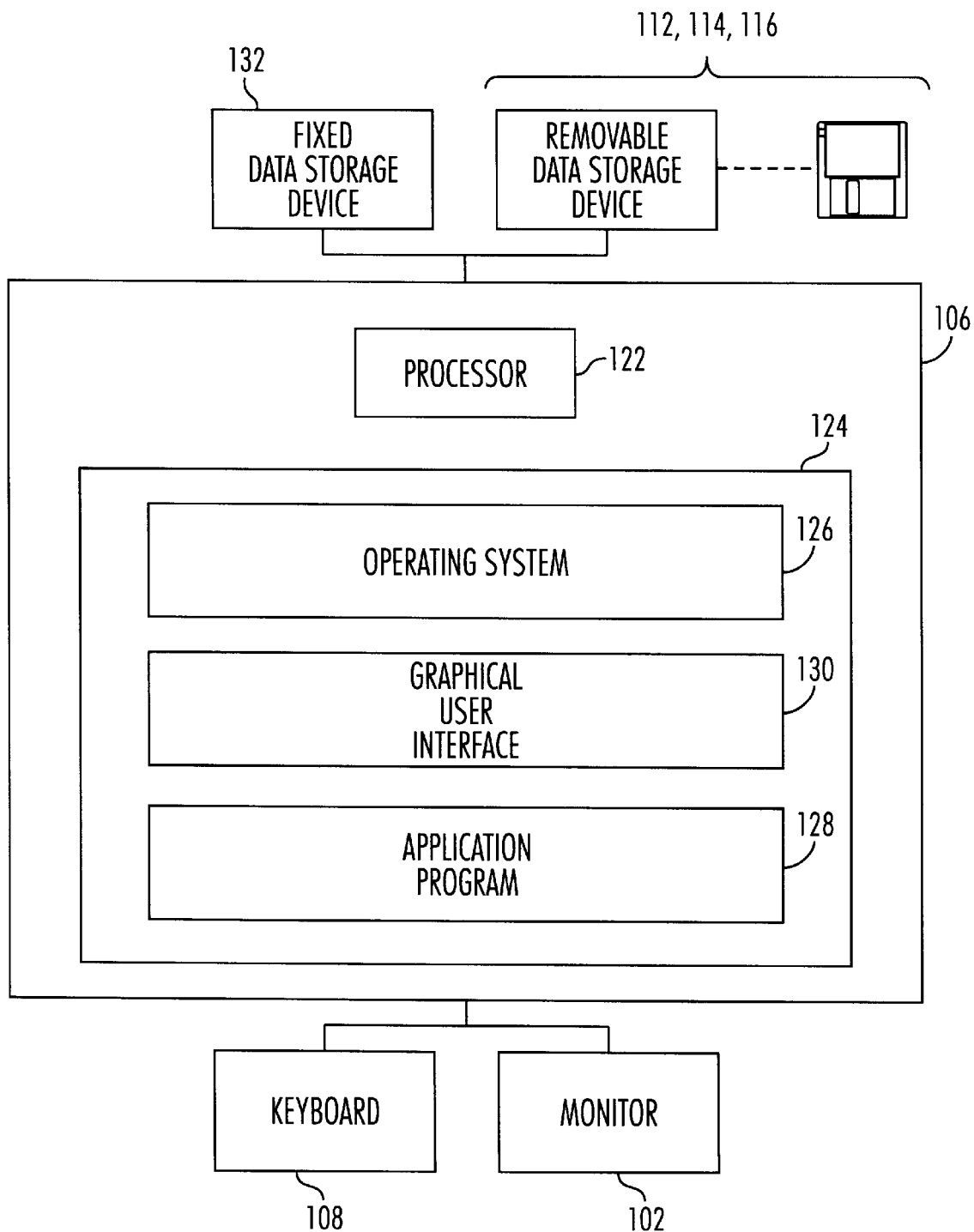

FIGS. 1 and 2 illustrate an exemplary computer hardware environment that could be used with the present invention.

In the exemplary environment, a computer system 100 comprises a computer 106 coupled to I/O devices such as a monitor 102, a keyboard 108, a mouse device 110, a removable disk 112 or 114 and associated drive 116, a CDROM device (not shown), audio speakers (not shown), and a printer 118. The computer 106 could also be coupled to other I/O devices, including a local area network (LAN) or wide area network (WAN) via interface cable 120. The monitor 102 presents a display 104 visually depicting information from the computer system 100 to the user.

The computer 106 generally includes a processor and a memory including random access memory (RAM), read only memory (ROM), and/or other components. The computer 106 operates under control of an operating system 126 such as Windows™, OS/2™, Macintosh™, AIX™, UNIX™, DOS™, Windows95, Windows NT™etc., stored in the memory to present data to the user on the display 102 and to accept and process commands from the user via keyboard 108 and mouse device 110.

The present invention is preferably implemented using one or more computer programs or applications 128 through a graphical user interface. These computer programs 128 are depicted as windows 124 presented on the display 104, operating under control of the operating system 126, to implement a graphical user interface 130.

Generally, the operating system and the computer programs implementing the present invention are tangibly embodied in a computer-readable medium, e.g. one or more of removable data storage devices 112, 114, such as a zip or floppy disc drive, or fixed data storage devices 132, including for example, a hard drive, CD-ROM drive, or tape drive. Also, the relational databases used with the present invention can be stored in data storage devices 132, 112, 114, or may be stored off-line and accessed via interface cable 120.

Those skilled in the art will recognize that the exemplary environment illustrated in FIG. 1 is not intended to limit the present invention. Indeed, those skilled in the art will recognize that other alternative hardware environments may be used without departing from the scope of the present invention.

User Operation

The operation of the present invention is described with reference to FIGS. 3A–3L, which illustrate exemplary embodiments of the user interface aspects of the present invention.

The present invention provides the user with the capability to define a database command SELECT statement before the records are retrieved, thus decreasing the time required to access and retrieve the records. The operation of the present invention is described as follows.

Tables Tab Window

Figure 3A:
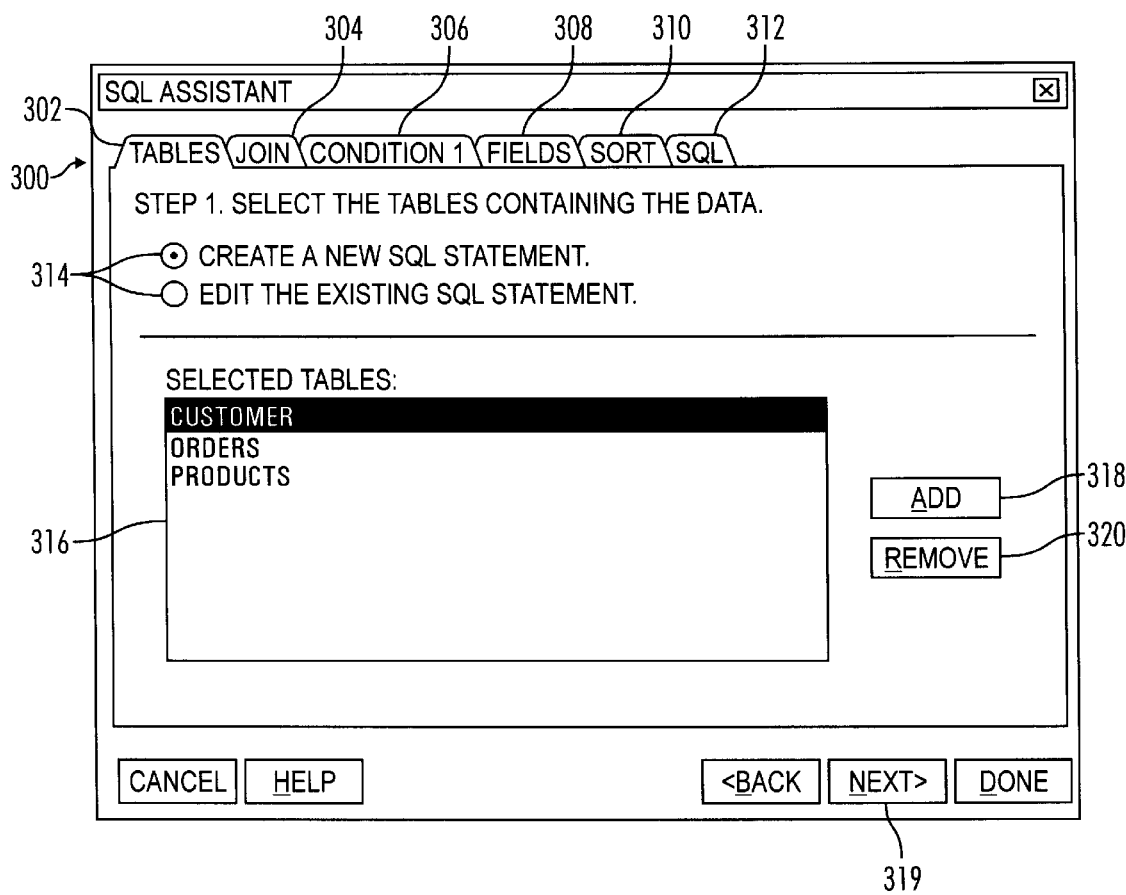
Figure 3B:
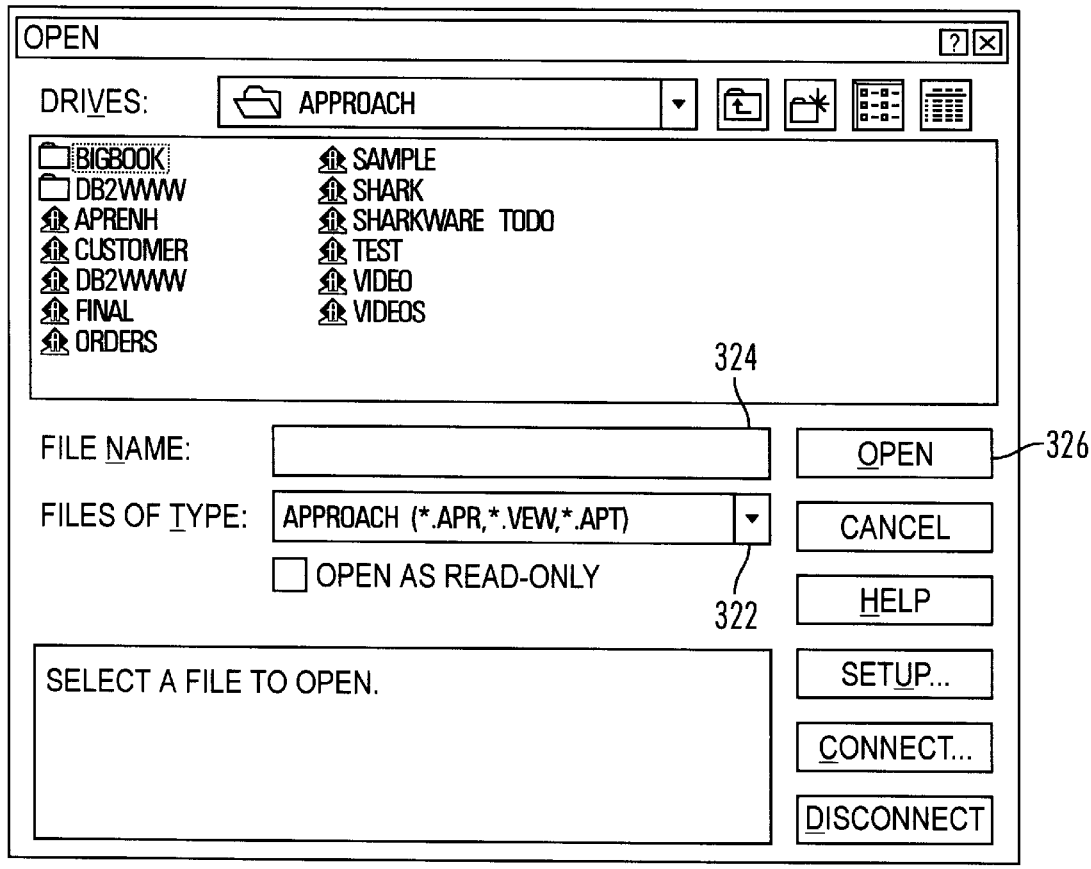

FIG. 3A presents a diagram of an exemplary embodiment of the user-interface of the present invention. The user interface comprises a table tab window 300 presented on the display 104 of the computer system 100, which includes a plurality of tabs 302–312 used to navigate the user interface. The information shown in FIG. 3A is displayed when the user selects the table tab 302. This provides a list of the database tables the user has currently selected for use in the selected tables box 316. First, the user must indicate whether a new SQL statement is being created or the user wishes to edit an existing SQL statement by selecting from radio buttons 314. The user can then remove tables selected in the selected tables box 316 by pressing the remove button 320, or add tables by pressing the add button 318. If the user selects the add button 318, a standard Windows™ "Open Dialog" window will appear. This is shown in FIG. 3B. The user can choose to display different file types by selecting the files of type button 322. Using standard Windows™ techniques, the user may also browse through the directory and table listings and select database tables for opening. The user can select multiple SQL tables, but may only select one table at a time for non-SQL tables. If the user has chosen a non-SQL table, the add button 318 becomes gray, indicating that join operations cannot be performed across these tables.

When the user has completed making database table selections, the OK button 326 is selected, and the selected database table will appear in the selected tables listbox 316 depicted in FIG. 3A. The user can then choose one or more tables in the selected tables listbox 316 and click on the remove button 320 to remove database tables from the selected tables listbox 316.

At any time in the definition of the SQL statement, the user can remove a database table listed in the selected tables listbox 316 by clicking on the database table to be removed, and selecting the remove button 320. If the user attempts to remove a table after having created a partial or full SQL statement, a dialog box will appear on the display 104 warning the user that the current SQL statement will be lost, and the user will be forced to begin again. If this happens, all entries in all of the tab windows 302–312 will be deleted. The user can select on the next button 319 or any of tabs 302–312, to proceed.

Join Tab Window

Figure 3C:
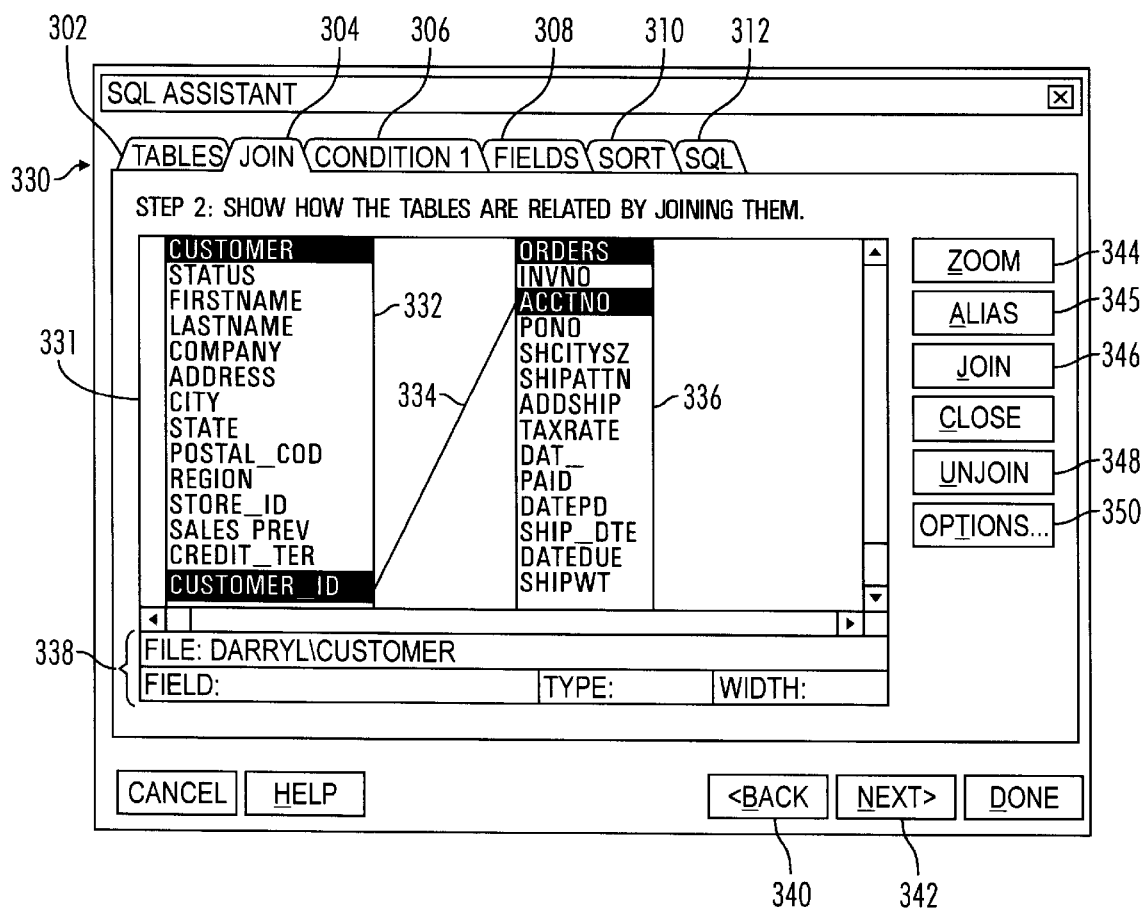

FIG. 3C shows the join tab window of the present invention. The join tab window 330 displays all of the database tables selected by the user using the tables tab window depicted and described with reference to FIG. 3A. The join tab window 330 comprises a join window display box 331, table information boxes 338 which display the file, field, field type, and field width of the currently chosen database field. Join button 346 is initially disabled, and becomes enabled when the user selects two fields in different tables in the join window display box 331. Once selected fields have been joined, as indicated by a join line 334 displayed in the join window display box 331, join button 346 becomes disabled until the user selects additional fields. Alternatively joins may be created by dragging a field, such as the "CUSTOMER_ID" field depicted in the "CUSTOMER" table 332 from one of the tables, and dropping it in another table, such as the "ORDERS" table 336. The unjoin button 348 is initially disabled until the user selects a joint relationship between two database tables by selecting the join line 334 between the database tables 332 and 336. If the user selects the unjoin button 348, the join between the two selected database tables is removed. Alias button 345 allows user definition of specified data field table, or other relationships.

Relational Operations Dialog Box

Figure 3D:
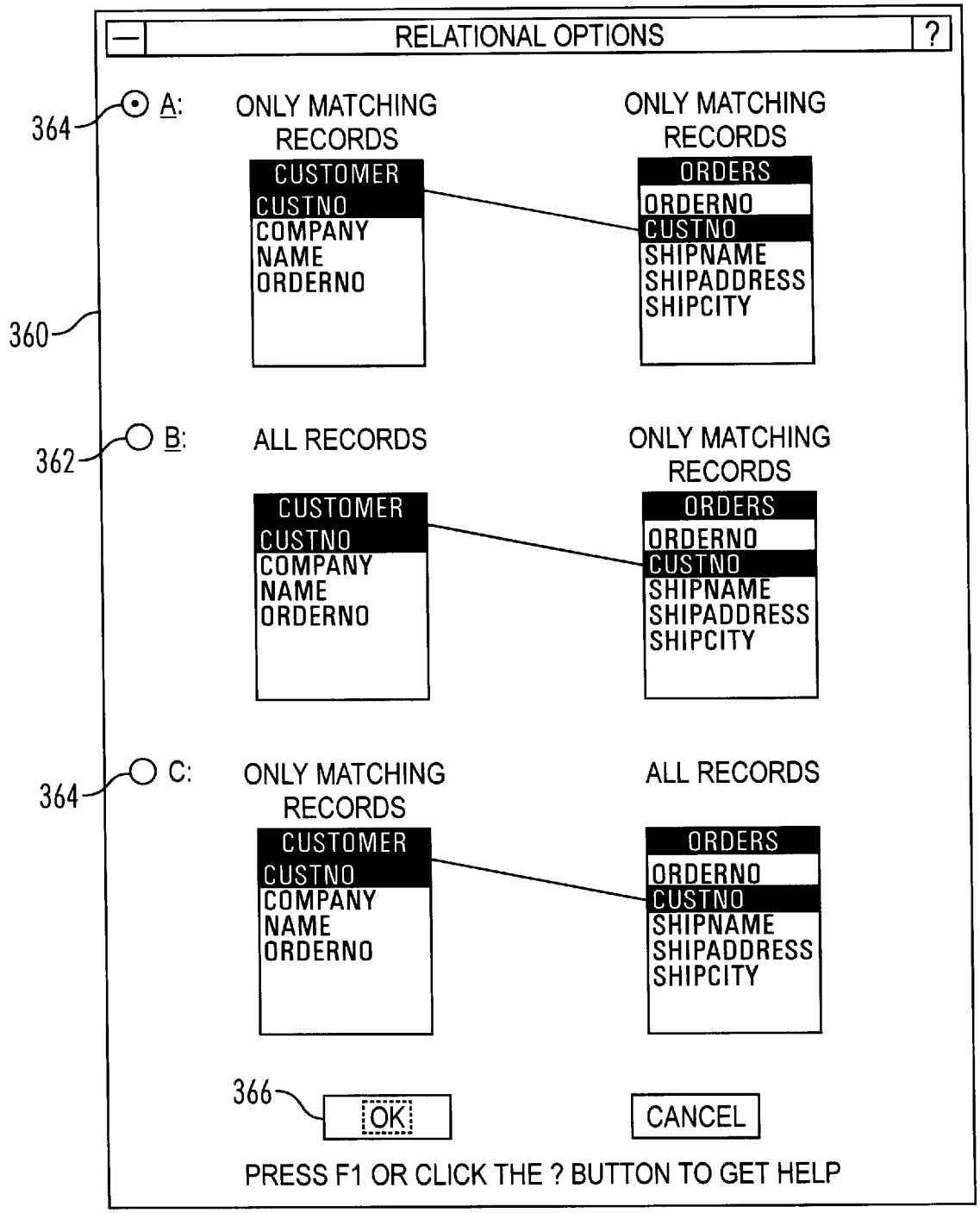

FIG. 3D presents an illustration of the relational operations dialog box 360 of the present invention. This dialog box appears on the display 104 when the user selects the options button 350 of the join tab window 330. The user selects whether the table join operation is an inner join, left outer join, or right outer join by making appropriate selections radio button 364 selections in the relational operations dialog box 360. When this process is completed, the user selects the relational options OK button 366, which returns causes the join window display box 331 to be presented on the display 104.

Condition Tab Window

Figure 3E:
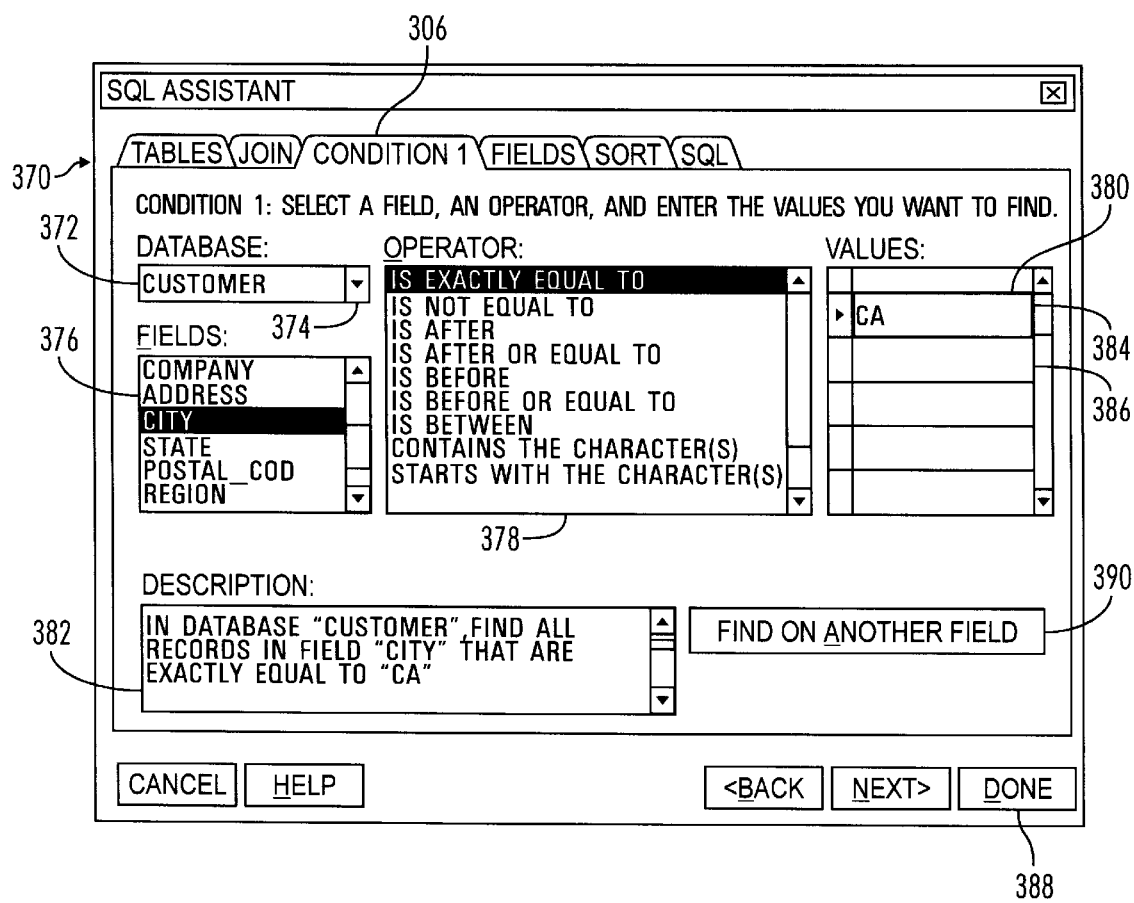

FIG. 3E presents the condition tab window 370 of the present invention. The condition tab window 370 is presented on the display 104 when the user selects the condition tab 306. The condition tab window 370 comprises a database table dropdown listbox 372 controlled by selecting a database table dropdown listbox tab 374, an associated field listbox 376, which displays the fields in the selected database table, a relational condition listbox 378, a search string edit box 380, and a natural language translation listbox 382. The user creates the search portion of an SQL statement (that portion following the WHERE clause) by selecting a table from the database table dropdown listbox 372. This is accomplished by selecting the database table dropdown listbox tab 374. The user also selects an associated database field from those available listed in the associated field listbox 376, and a relational conditional operator from those listed in the relational condition listbox 378. Next, the user enters any desired search string in the search string listbox 380. The computer system 100 then interprets the values selected above, and displays a natural language translation of the database commands selected above in the natural language translation listbox 382 in the condition tab window 370. The user can now view a plain-language translation of the selected database command, and make any alterations or changes necessary to ensure that the proper data is retrieved, before actually submitting the SQL request.

Figure 3F:
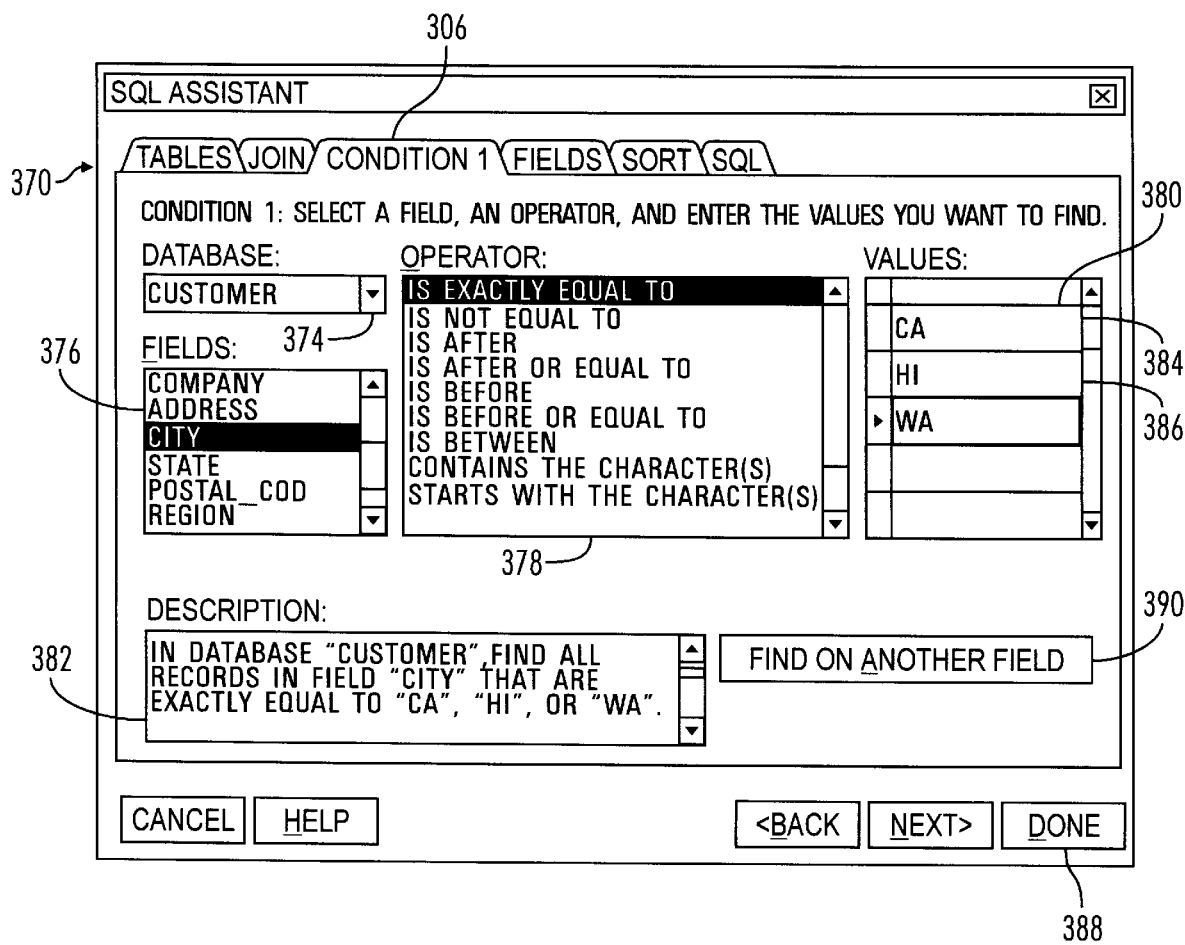

The user can create an "or" condition by (1) entering values in each line in the search string listbox 380, such as entries 384 and 386, as shown in FIG. 3F, or (2) comma separating each item in one line of the search string listbox 380 listbox.

If the user does not require any additional search criteria, the user selects the condition tab window OK button 388. If the user requires additional search criteria, the "find on another field" button 390 is selected.

Second Condition Tab Window

Figure 3G:
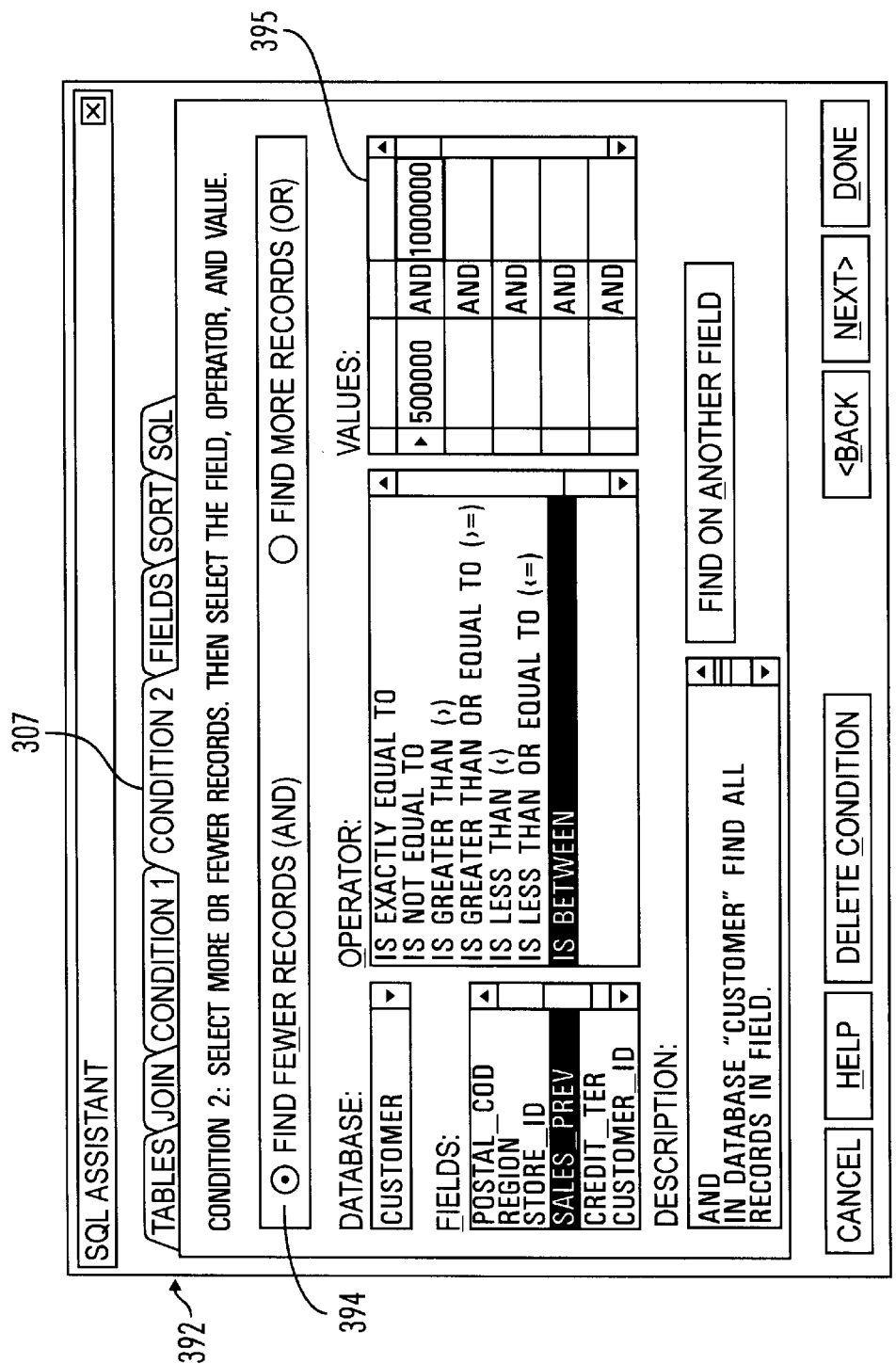

FIG. 3G is an exemplary embodiment of a second condition tab window 392. The second condition tab window is presented on the display 104 in response to the user selecting the "find another field" button 390 in the first condition tab window 370. The second condition tab window 392 differs from the first condition tab window 370 in that there are two radio buttons 394 at the top of the panel, indicating one or more logical condition operators. In the exemplary embodiment shown, these buttons are used to select whether the second condition should widen the search (by applying a logical "or" between conditions), or narrow the search (by applying a logical "and" between conditions.) By default, the "and" logical condition operator is selected. Once the logical condition operator has been selected, the user proceeds to enter the database table, associated database field, relational conditional operator, and values in box 395 and search string as before. When completed, the combined search criteria, or database command is interpreted and translated in the natural language translation listbox 382.

Fields Tab Window

Figure 3H:
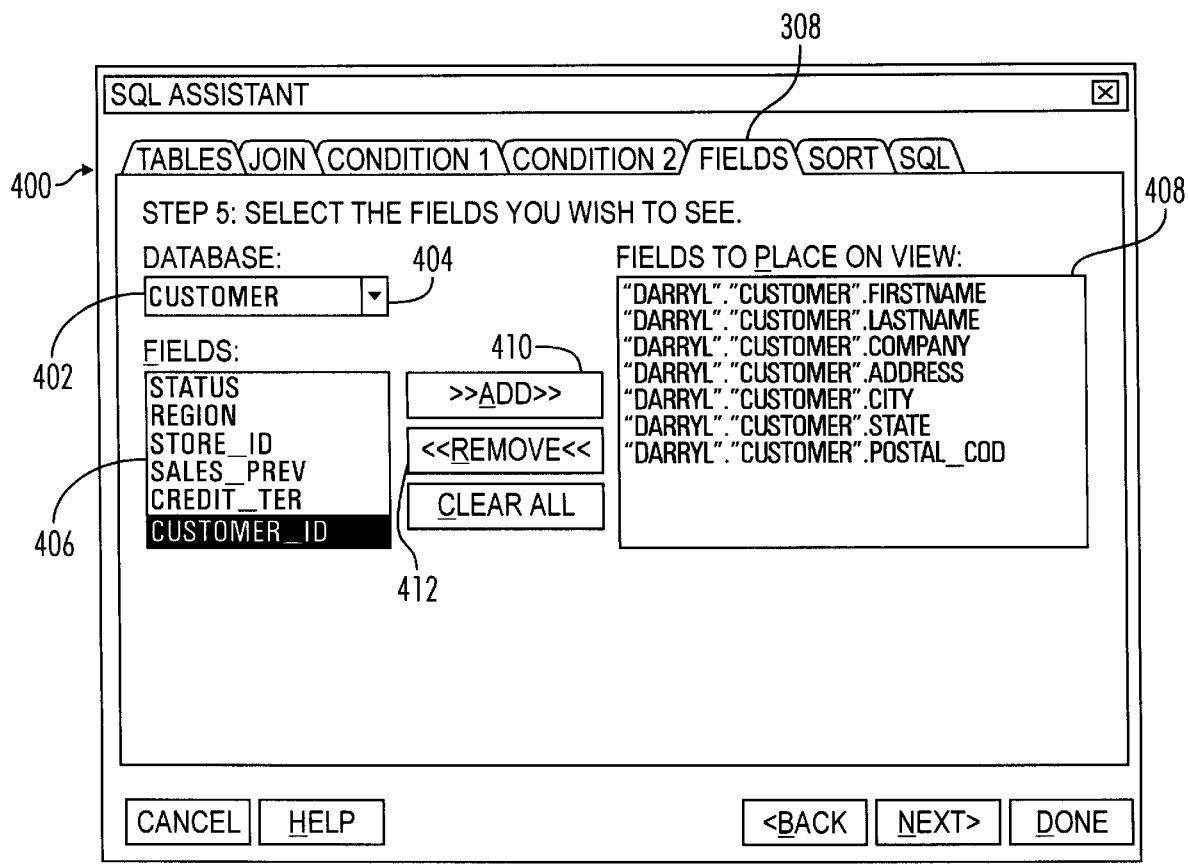
Figure 31:
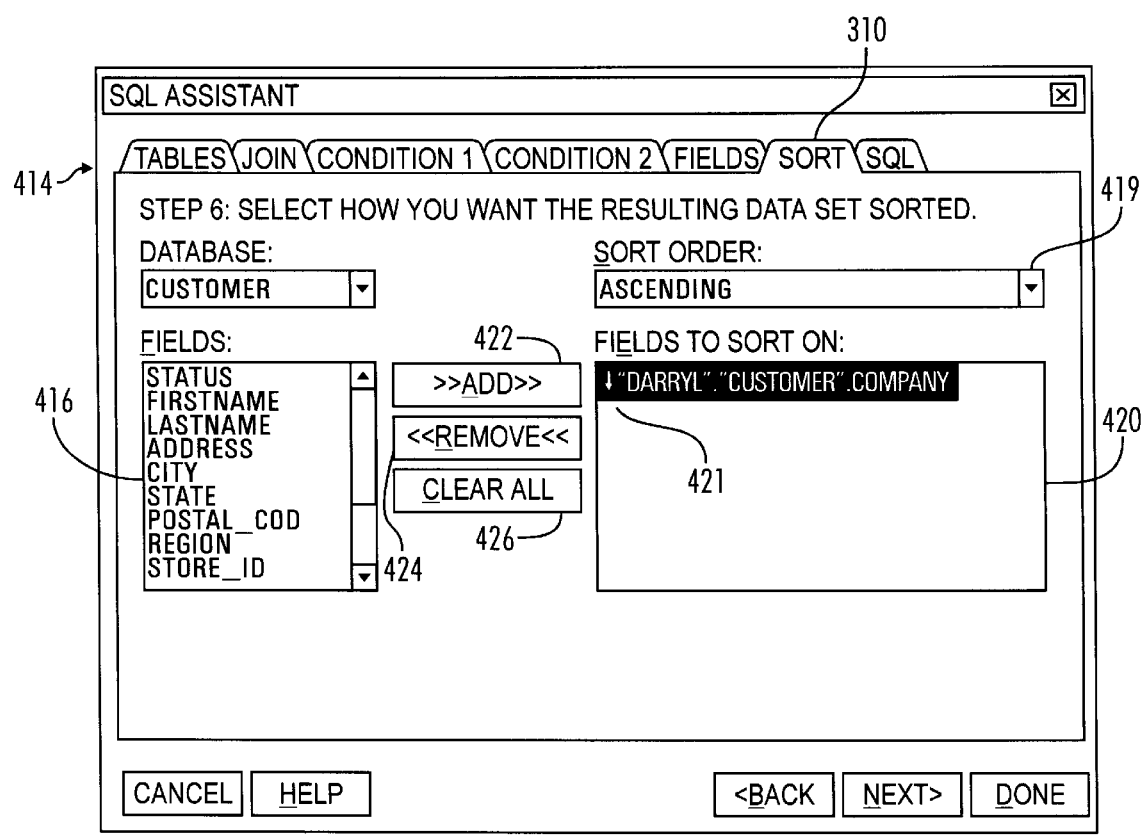

FIG. 3H shows an exemplary embodiment of a fields tab window 400. The fields tab window 400 is used to customize the format for viewing database command results, and is presented on the display 104 when the user selects the fields tab 308. The fields tab window 400 allows the user to select the database fields for viewing after the search is completed. The user selects the database from the field tab window database dropdown listbox 402, which is controlled by the field tab window database dropdown listbox tab 404. The user then selects database fields from the field tab window field listbox 406, and adds these selections to the field tab window selected field listbox 408 by selecting add button 410. Add button 410 is initially disabled, and enabled when the user selects a database field. Selected database fields can also be removed from the field tab window selected field listbox 408 by selecting the remove button 412. The remove button becomes active when fields in the field tab window selected field listbox 408. When each of the desired fields are copied into the field tab window selected field listbox 408, the computer system 100 appends the field name to the database name and displays both on the field tab window selected field listbox 408 separated by a period delimiter.

Sort Tab Window

Figure 3J:
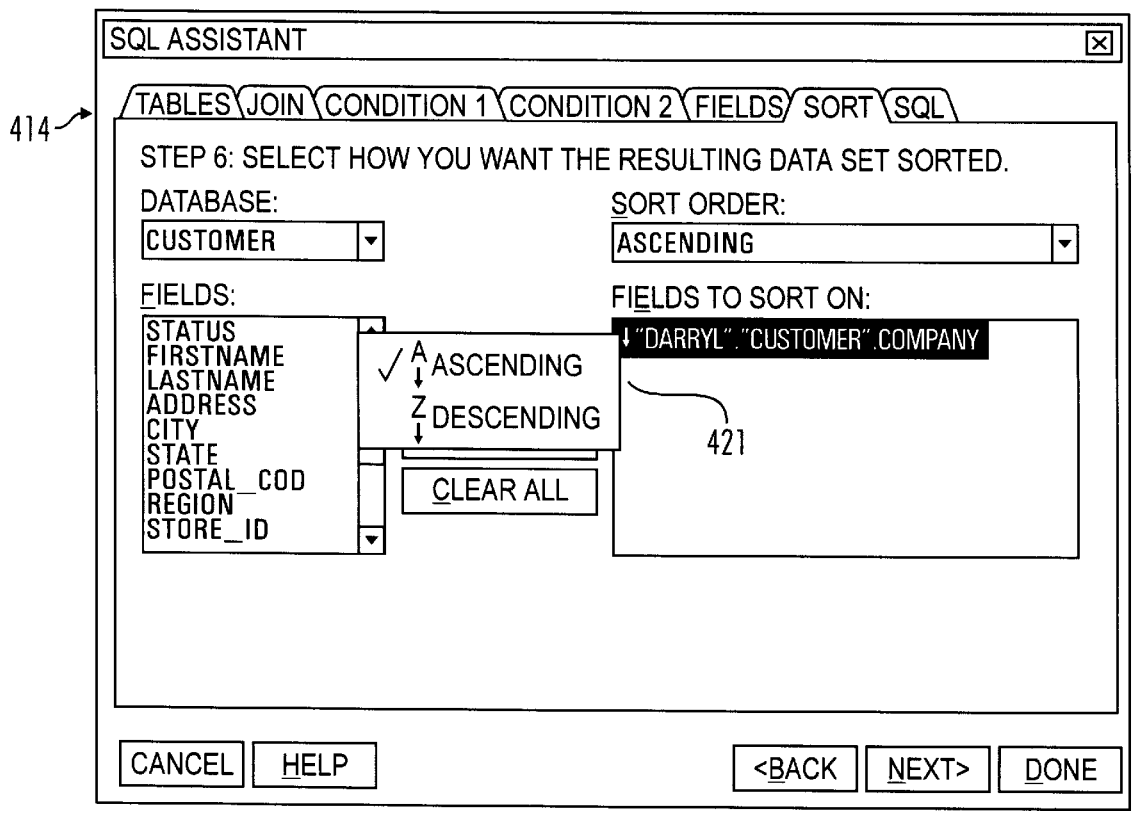

FIG. 3I presents an exemplary embodiment of the sort tab window 414, which is selected by the sort tab 310. The sort tab window 414 allows the user to sort data before viewing it on the display 104. The sort tab window 414 contains a sort tab window database field listbox 416, which lists all of the database fields in the user-selected database tables. Using the mouse device 110, the user can double click on any of these fields or single click on the field and select the sort tab window add button 422 (shown disabled) to move them to the "fields to sort" 420. The user can select the sort criteria as "ascending" or "descending" by using the sort order dropdown box 419, or by selecting the indicator icon 421 preceding each field. If the indicator icon 421 is selected, pop-up buttons 421 as shown in FIG. 3J are presented. Likewise, the user can remove fields from the "fields to sort" listbox 420 by double clicking on the selections, or by single clicking on the selections and selecting the sort tab window remove button 424. All fields in the "fields to sort" listbox 424 can be cleared by selecting the sort tab window clear all button 426.

SOL Tab Window

Figure 3K:
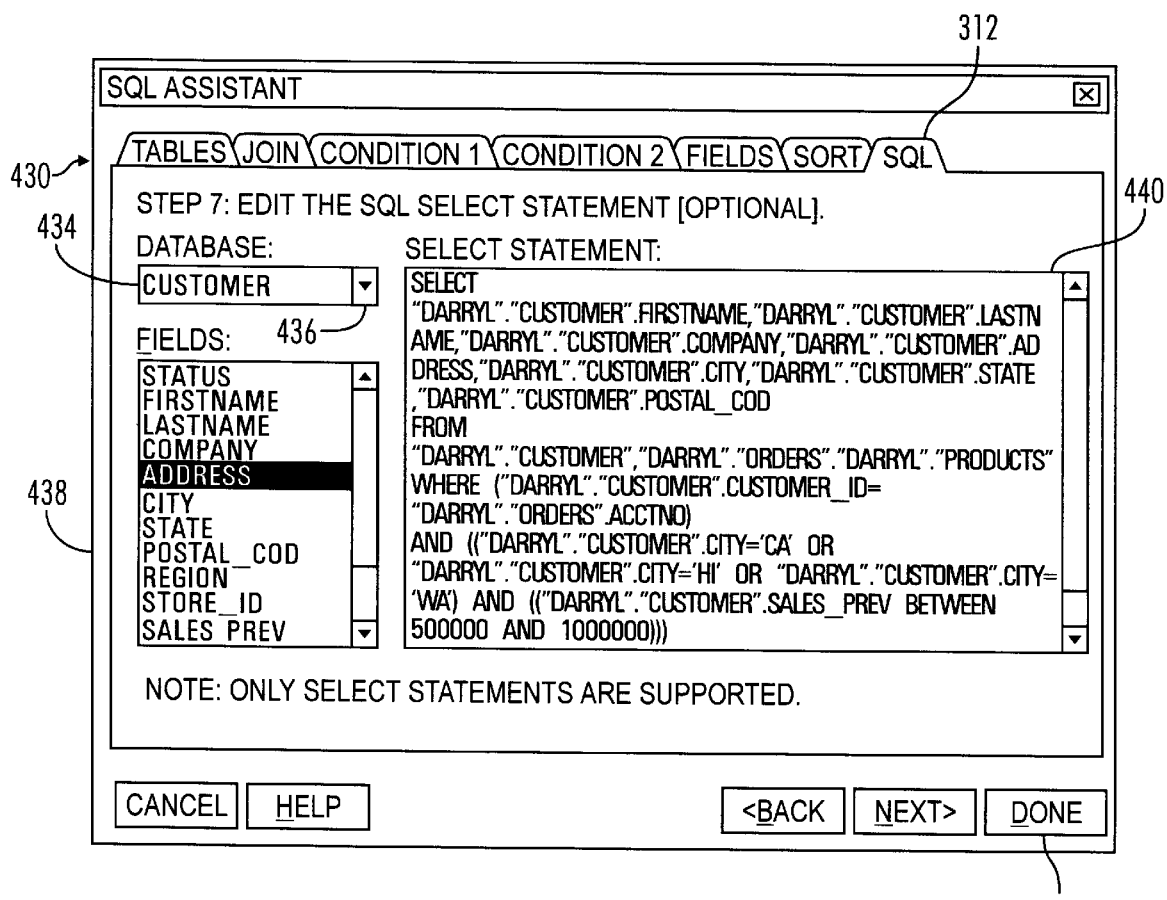

FIG. 3K presents an exemplary embodiment of the SQL tab window. The SQL tab window 414 is presented on the display 104 when the user selects the SQL tab 312.

The SQL tab window 430 comprises an SQL statement edit box 440, in which an SQL statement generated by the foregoing user input is displayed. The SQL statement word wraps within the box automatically. If the SQL statement is too long to view in the SQL statement edit box 440 in its entirety, the statement is word-wrapped and scroll bars are appended to the SQL statement edit box 440.

Each keyword in the SQL statement (such as SELECT, FROM, WHERE, ORDER BY) are placed on a new line to increase readability. Using the mouse device 110, the user can select within this field and highlight information. If the user attempts to modify information in the SQL statement edit box 440, a dialog box appears and warns the user that all tabs except the tables 302 and SQL tabs 312 will become disabled, and other aspects of the user interface described herein will no longer be available for use. The dialog box allows the user to proceed or return. If the user returns, the SQL tab window 430 is again presented on the display 104, with no changes made. If the user proceeds, the SQL statement edit box 440 will become active, and will allow manual SQL statement changes. The user retains the option of returning to the unmodified SQL statement (without the manual changes) by selecting the "restore SQL statement" button 444. This deletes all manual changes to the SQL statement listed in the SQL statement box 440.

The SQL tab window also comprises an SQL tab window database table dropdown listbox 434 and an SQL tab window associated field listbox 438, which allow the user to view the tables and fields and is provided primarily for user reference. When making editing changes to the SQL statement edit box 440. If the user selects the SQL tab window database table dropdown listbox tab 434, a list of all database tables that are currently open and available for searching are displayed in the SQL tab window database table dropdown listbox 434. When a database table is selected, the names of the fields associated with the selected database table are displayed in the SQL tab window associated fields listbox 438. When the user selects a field, the database field name will be placed in the SQL statement edit box 440 at the cursor position. Alternatively, the user then may also drag a field name from the SQL tab window associated fields listbox 438 and drop it into the SQL statement edit box 440. When the user is dropping a field name, an extended underscore (___) will appear in the SQL statement editbox 440 allowing the user to select where in the SQL statement edit box 440 the fieldname will be placed. If this is the first item to be changed, the database field name is appended to the SQL statement, and a dialog box appears to warn the user after the modifications have been made, the user must make any further modifications manually.

Figure 3L:
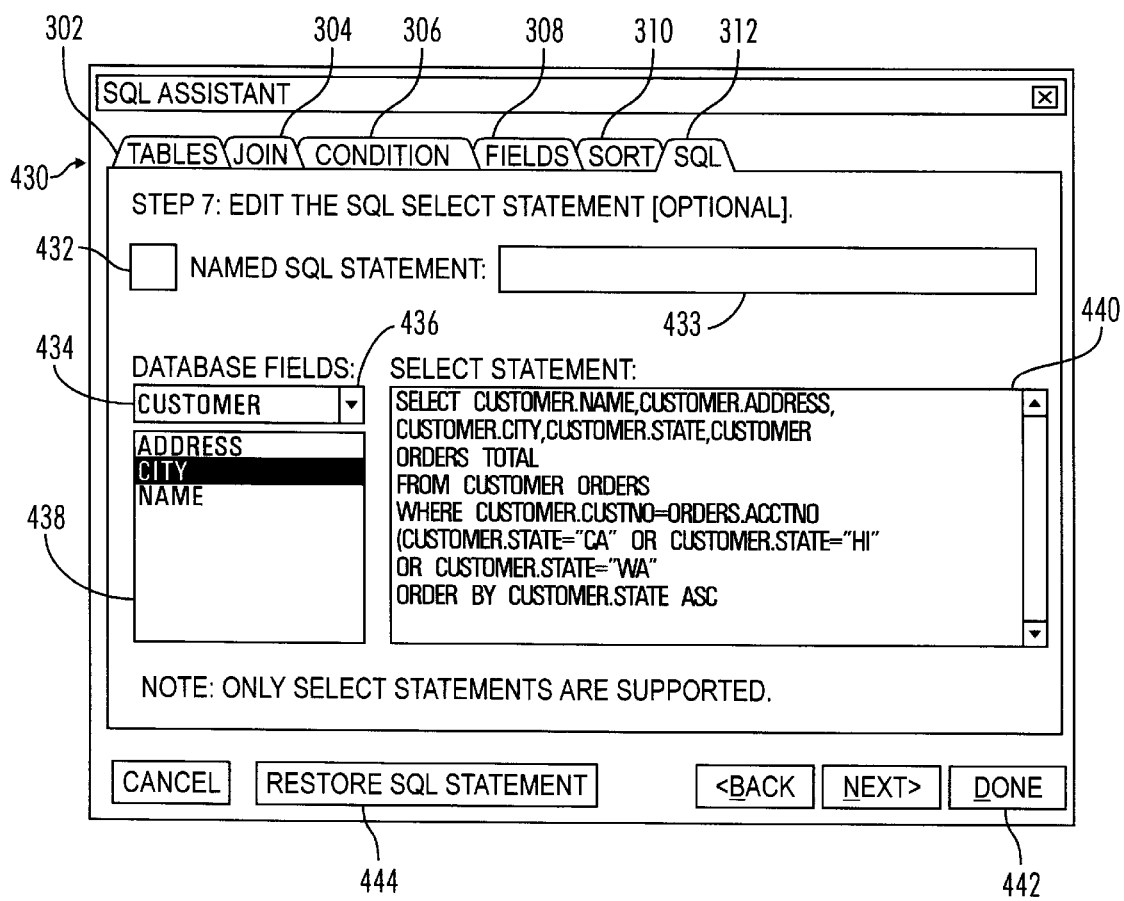

FIG. 3L illustrates an alternative embodiment of the user interface when the SQL tab 312 is selected. This embodiment features a named SQL statement indicator 432 and edit box 440. This allows the user to give a simple, plain-language name for frequently used searches, thereby making the user interface easier to use. For example, the user may wish to name an SQL statement retrieving all customers in California whose orders exceeded $10,000 by naming the SQL statement "GOOD_CAL." Thereafter, using this feature, the user can use the term "GOOD_CAL" in place of the equivalent SQL statement.

The user may also proceed directly to the SQL tab window 430 without entering information in the tab windows selected by tabs 302–312. When this happens, the user can click the SQL statement box 440 and manually enter an SQL SELECT statement. Since no SQL statement was created, no warning dialog box is required in this situation, however, as soon as the user begins entering data into the SQL statement box 440 manually, all tabs except the tables 302 and the SQL tabs 312 are disabled. If the user deletes the entire manually entered SQL SELECT statement, all tabs 302–312 become re-enabled.

After the SQL statement is completely entered, the user selects DONE button 442. At this time, the SQL statement is parsed and sent to the SQL database. If the parser finds an error within the SQL statement, a dialog box indicates as such to the user.

Flow Control

Figure 4A:
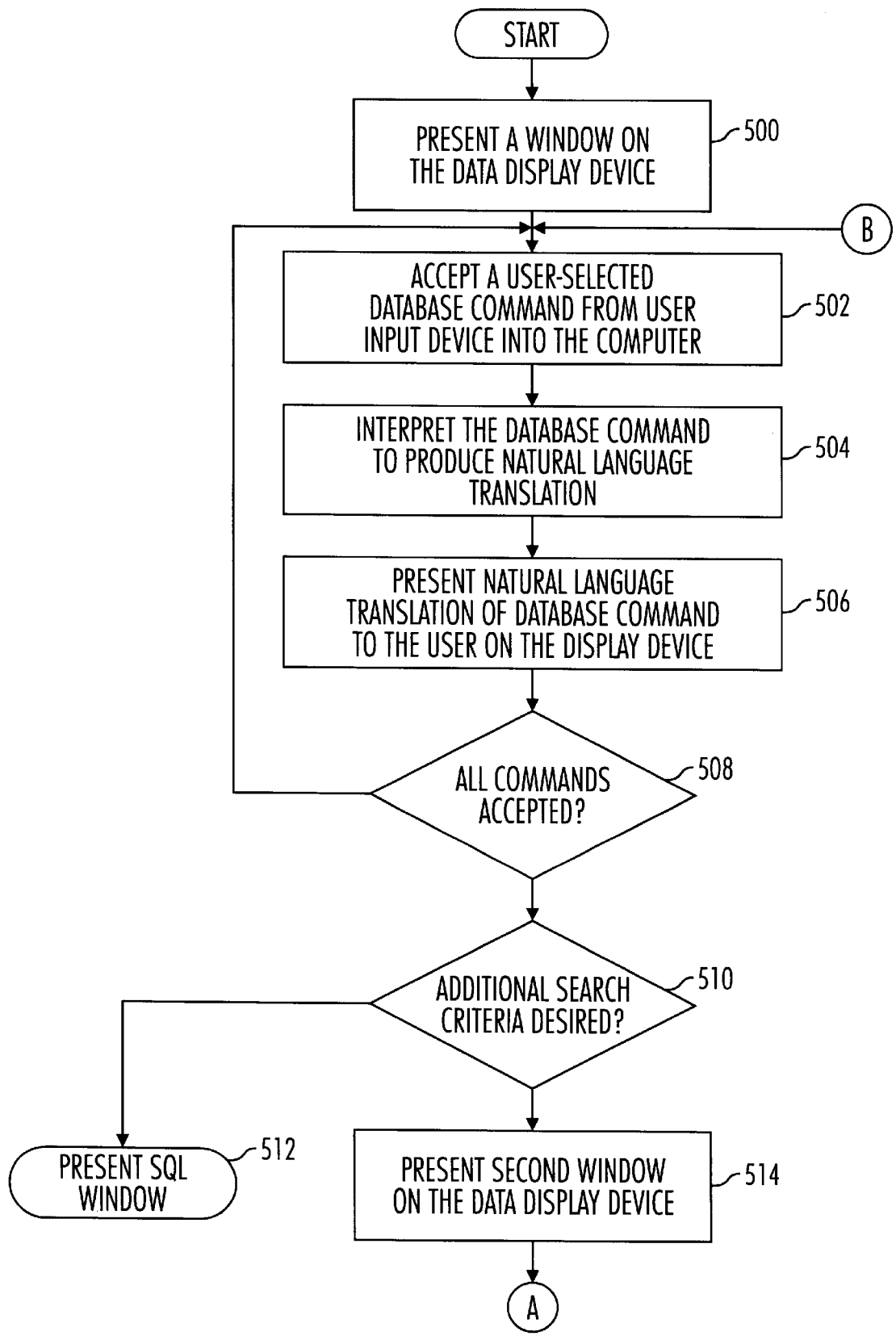
FIGS. 4A–4C are flow charts describing the operation of the present invention.
Figure 4B:
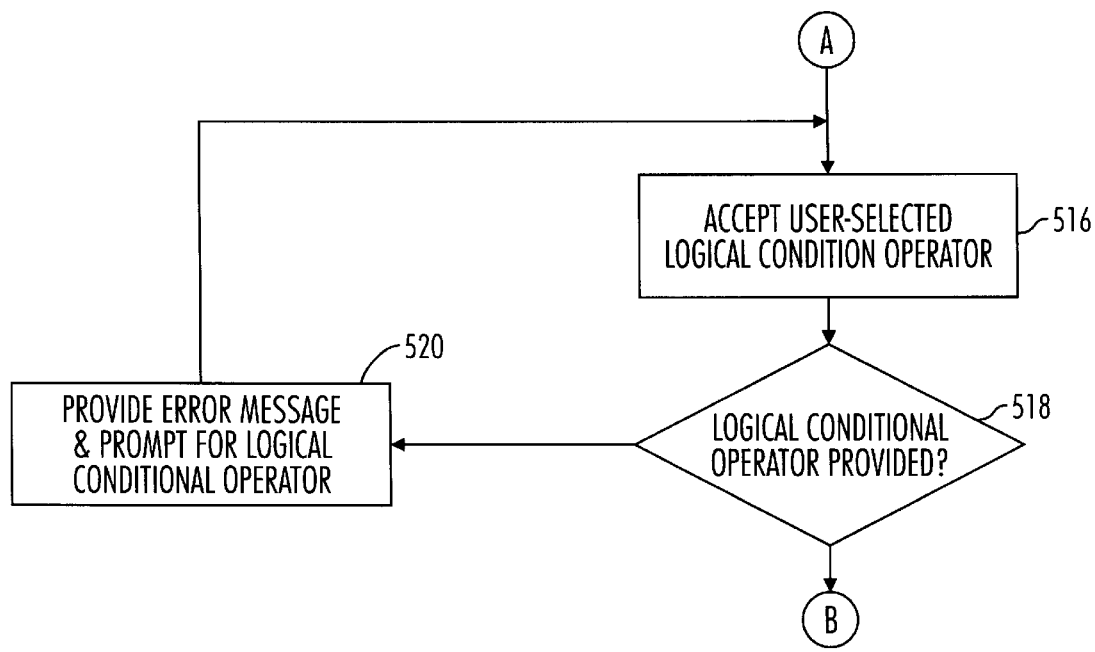
Figure 4C:
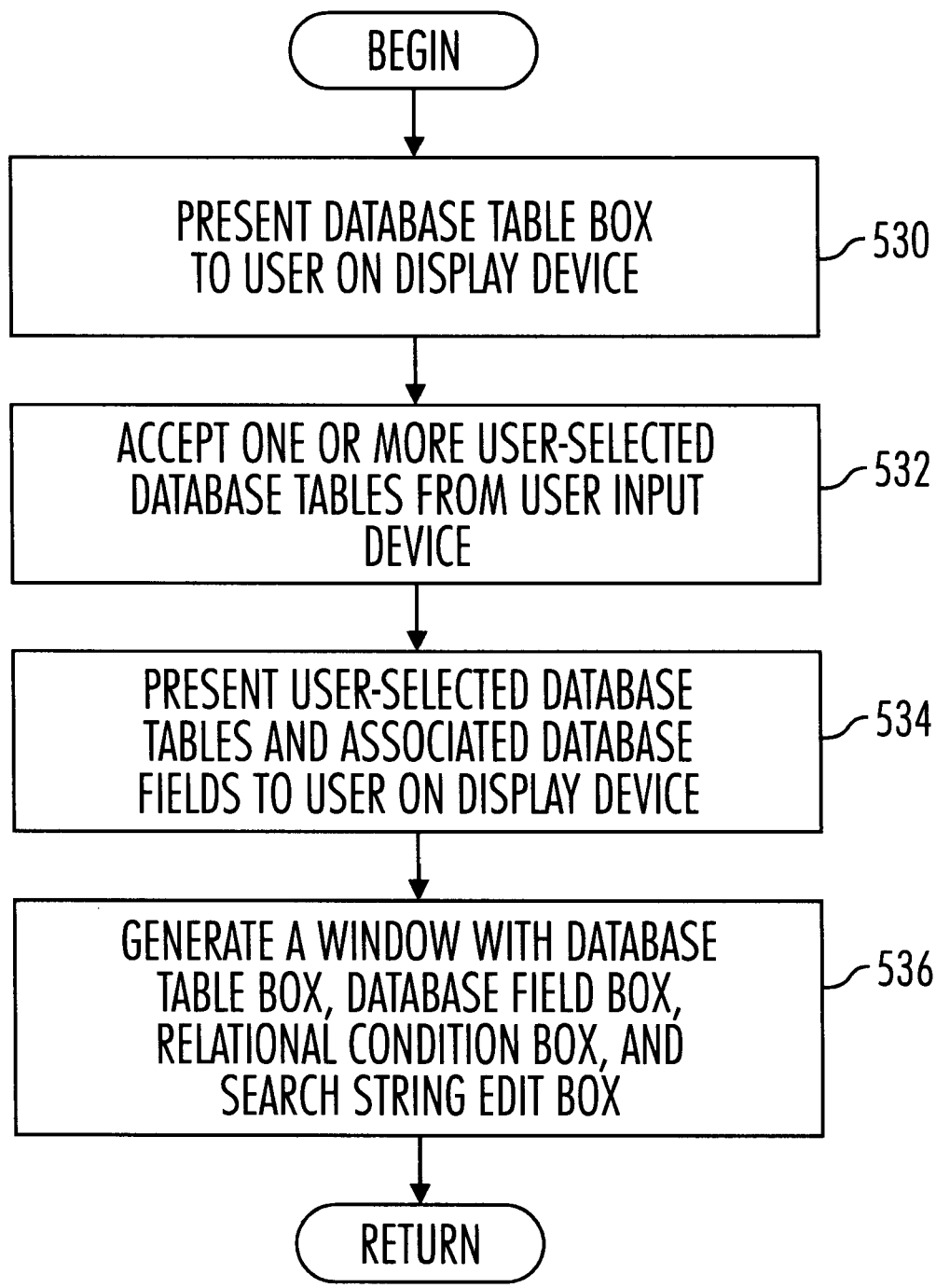

FIGS. 4A–4C are flow charts illustrating the logical operation of the present invention. The process begins with the computer 106 presenting a window 124 on the display 104. This is represented by block 500 in FIG. 4A. In one embodiment, the window 124 is the condition tab window 370 depicted in FIG. 3E. Next, the computer 106 accepts user-selected database commands from the a user input device such as the keyboard 108 and mouse device 110. This process is depicted by block 502. The user-selected database commands are selected from a group comprising a database table dropdown listbox 372 having a list of database tables, the associated database field listbox 376, a relational condition listbox 378, and a search string edit box 380. After the user makes the selection, the database command is interpreted as depicted in blocks 504 and 506, and a natural language translation of the database command is presented to the user on the display 104. This allows the user to select database commands from a menu structure and immediately see the result in plain language on the same display. The foregoing process is completed until, as shown in block 508, all commands have been accepted, and an SQL query has been defined.

If no additional search criteria are desired, block 510 presents the SQL tab window to the user to allow manual editing of the SQL command. If additional search criteria are required, a second condition tab window 392 is presented to the user on the display 104. This is depicted in block 514.

FIG. 4B illustrates the remainder of the process described above. After presenting a second condition tab window 392 on the display device 104, the computer 106 accepts a user-selected logical condition to define the logical relationship between the previous search criteria and the additional criteria about to be defined by the user. This requires that the user input a logical conditional operator such as an "or" which retrieves more data records, or an "and" which retrieves less data records. This process is depicted in block 516. If a logical conditional operator is not supplied, block 518 prompts interrupts processing, and prompts the user to enter a logical conditional operator. This process is visually depicted in FIG. 3G, where the user selects the logical conditional operator using radio buttons 394.

After the logical conditional operator is supplied, processing returns to block 502, and the computer 106 accepts additional user-selected database command information. This information will include, for example, a second database table, a second associated database field, a second relational conditional operator, and a second user-defined search string. As before, this information is interpreted by block 504, and a natural language translation of the search request is presented to the user on the display device as the information is entered.

FIG. 4C is a flow diagram showing the operations used to present a window on the display 104. In block 530, a database table box is presented to the user on the display 104. Next, one or more user-selected database tables are accepted from a user input device, as shown in block 532. The user-selected database tables and associated database fields are then displayed to the user by block 534. Finally, a window is generated a database table box, database field box, a relational condition box, and a search string edit box. This is depicted in block 536.

Conclusion

This concludes the description of the preferred embodiment of the invention. The present invention discloses a method, apparatus, and article of manufacture for displaying database management information on a computer. The method comprises the steps of displaying a window on a computer display device, accepting a user-selected database command from a user input device coupled to the computer, interpreting the user-selected database command to produce a natural language translation of the command, and presenting the natural language translation of the command to the user on the display device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method of displaying database management system information comprising a plurality of database tables each including a plurality of associated database fields having database data, the method comprising the steps of:

(a) displaying a window on a display device coupled to a computer;

(b) accepting at least one user-selected database command selected from the window into the computer using a user input device coupled to the computer;

(c) interpreting the user-selected database commands to produce a natural language translation of the user-selected database commands;

(d) presenting the natural language translation of the user-selected database commands to the user in the window on the display device; and (e) processing the user-selected database command to perform a database operation requested by the user-selected command.

2. The method of claim 1, wherein:

the window comprises a natural translation list box and at least one box selected from the group comprising a database table box having a list of the database tables, an associated database field box having a list of the associated database fields, a relational condition box, and a search string edit box; and the user selected database command is selected from the group comprising a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

3. The method of 1, wherein:

the window includes a database table box having a list of the database tables, an associated database field box having a list of the associated database fields, a relational condition box, a search string edit box, and a natural translation list box; and the user-selected database command comprises a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

4. The method of claim 3, wherein the step of displaying a window on the data display device comprises the steps of:

presenting a database table box comprising a list of the plurality of database tables to the user on the display device;

accepting one or more user-selected database tables from the user input device;

presenting the user-selected database tables and associated database fields to the user on the display device;

accepting one or more user-selected database table join relationships between the presented database tables to define joined database tables; and generating a window comprising a database table box having a list of the joined database tables, a database field box having a list of the associated database fields, a relational condition box comprising a list of available relational conditional operators, a search string edit box, and a natural translation box.

5. The method of claim 3, wherein the window is used to enter an initial user selectable search criteria, further comprising the steps of:

presenting a second window used to enter a second user selectable search criteria on the data display device, the second window comprising a second database table box, a second associated database field box, the relational condition box, a second search string edit box, a plurality of logical condition radio buttons defining available logical condition operators, and the natural translation box;

accepting a user-selected logical conditional operator describing a logical relationship between the initial user selectable search criteria and the second user selectable search criteria;

accepting a second user-selected database table from the second database table box, a second associated database field from the second associated database field box, a second user-defined search parameter selected from the second search parameter edit box, a second user selected relational conditional operator selected from the relational condition box; and generating the user-selected database command from the user selected database field, the second user-selected database field, the user-selected conditional operator, the second user-selected conditional operator, the user-defined search parameter, and the second user-defined search parameter.

6. The method of claim 5, further comprising the step of providing an error message in a dialog box on the display device if no logical conditional operator is selected.

7. The method of claim 5, wherein the logical condition operator is selected from the group comprising an "or" and an "and."

8. The method of claim 3, wherein the user defined search string comprises search parameters and logical relationships between the search parameters.

9. An apparatus for displaying database management information, comprising a plurality of database tables each including a plurality of associated database fields having database data, the apparatus comprising:

(a) a computer, comprising a processor and a memory storing the database tables;

(b) means, performed by the computer, for displaying a window on a display coupled to the computer;

(c) means, performed by the computer for accepting at least one user-selected database command selected from the window into the computer using a user input device coupled to the computer;

(d) means, performed by the computer, for interpreting the user-selected database commands to produce a natural language translation of the user-selected database commands;

(e) means, performed by the computer, for presenting a natural language translation of the user-selected database commands to the user in the window on the display; and (f) means, performed by the computer, for processing the user-selected database command to perform a database operation requested by the user-selected command.

10. The apparatus of claim 9, wherein the window comprises a natural translation list box and at least one box selected from the group comprising a database table box having a list of the database tables, an associated database field box having a list of the associated database fields, a relational condition box, and a search string edit box; and the user selected database command is selected from the group comprising a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

11. The apparatus of claim 9, wherein:

the window includes a database table box having a list of the database tables, an associated database field box having a list of the associated database fields, a relational condition box, a search string edit box, and a natural translation list box; and the user-selected database command comprises a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

12. The apparatus of claim 11, wherein the means for displaying the window on the display device comprises:

means, performed by the computer, for presenting a database table box comprising a list of the plurality of database tables to the user on the display device;

means, performed by the computer, for accepting one or more user-selected database tables from the user input device;

means, performed by the computer, for presenting the user-selected database tables and associated database fields to the user on the display device;

means, performed by the computer, for accepting one or more user-selected database table join relationships between the presented database tables to define joined database tables; and means, performed by the computer, for generating a window comprising a database table box, having a list of the joined database tables, a database field box having a list of the associated database fields, a relational condition box, comprising a list of available conditional operators, a search string edit box, and a natural translation box.

13. The apparatus of claim 11, wherein the window is used to enter an initial user selectable search criteria, further comprising:

means, performed by the computer for presenting a second window used to enter a second user selectable search criteria on the data display device, the second window comprising a second database table box, a second associated database field box, the relational condition box, a second search string edit box, a plurality of logical condition radio buttons defining available logical condition operators, and the natural translation box;

means, performed by the computer, for accepting a user-selected logical conditional operator describing a logical relationship between the initial user selectable search criteria and the second user selectable search criteria;

means, performed by the computer, for accepting a second user-selected database table from the second database table box, a second associated database field from the second associated database field box, a second user-defined search parameter selected from the second search parameter edit box, a second user selected relational conditional operator selected from the relational condition box; and means, performed by the computer, for generating the user-selected database command from the user selected database field, the second user-selected database field, the user-selected conditional operator, the second user-selected conditional operator, the user-defined search parameter, and the second user-defined search parameter.

14. The apparatus of claim 13, further comprising means, performed by the computer, for providing an error message in a dialog box on the display devices if no logical conditional operator is selected.

15. The method of claim 13, wherein the logical condition operator is selected from the group comprising an "or" and an "and."

16. The apparatus of claim 11, wherein the user-defined search string comprises search parameters and a logical relationship between the search parameters.

17. A program storage device, readable by a computer having a processor, and a memory storing a plurality of database tables each including a plurality of associated database fields having database data, tangibly embodying one or more programs of instructions executable by the computer to perform method steps of displaying database management system information on the display, the method comprising the steps of:

(a) displaying a window on the display device coupled to the computer;

(b) accepting at least one user-selected database command selected from the window into the computer using a user input device coupled to the computer;

(c) interpreting the user-selected database commands to produce a natural language translation of the user-selected database commands; and (d) presenting the natural language translation of the user-selected database commands to the user in the window on the display device; and (e) processing the user-selected database command to perform a database operation requested by the user-selected command.

18. The program storage device of claim 17, wherein:

the window comprises a natural translation list box and at least one box selected from a group comprising a database table box having a list of the database tables, an associated database field box having a list of the associated database fields, a relational condition box, and a search string edit box; and the user selected database command is selected from a group comprising a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

19. The program storage device of claim 17, wherein:

the window includes a database table box having a list of the database tables, an associated database field box having a list of the associated database fields, a relational condition box, a search string edit box, and a natural translation list box; and the user-selected database command comprises a user-selected database table selected from the database table box, a user-selected database field selected from the database field box, a user-defined search string entered into the search parameter edit box, and a user-selected relational conditional operator selected from the relational condition box, the relational condition defining a selected relationship between the database data in the user-selected database field and the user-defined search string.

20. The program storage device of claim 19, wherein the method step of displaying a window on the data display device comprises the steps of:

presenting a database table box comprising a list of the plurality of database tables to the user on the display device;

accepting one or more user-selected database tables from the user input device;

presenting the user-selected database tables and associated database fields to the user on the display device;

accepting one or more user-selected database table join relationships between the presented database tables to define joined database tables; and generating a window comprising a database table box having a list of the joined database tables, a database field box having a list of the associated database fields, a relational condition box comprising a list of available relational conditional operators, a search string edit box, and a natural translation box.

21. The program storage device of claim 19, wherein the window is used to enter an initial user selectable search criteria, wherein the method steps further comprise the steps of:

presenting a second window used to enter a second user selectable search criteria on the data display device, the second window comprising a second database table box, a second associated database field box, the relational condition box, a second search string edit box, a plurality of logical condition radio buttons defining available logical condition operators, and the natural translation box;

accepting a user-selected logical conditional operator describing a logical relationship between the initial user selectable search criteria and the second user selectable search criteria;

accepting a second user-selected database table from the second database table box, a second associated database field from the second associated database field box, a second user-defined search parameter selected from the second search parameter edit box, a second user selected relational conditional operator selected from the relational condition box; and generating the user-selected database command from the user selected database field, the second user-selected database field, the user-selected conditional operator, the second user-selected conditional operator, the user-defined search parameter, and the second user-defined search parameter.

22. The program storage device of claim 21, wherein the method steps further comprise the step of providing an error message in a dialog box on the display device if no logical conditional operator is selected.

23. The program storage device of claim 21, wherein the logical condition operator is selected from the group comprising an "or" and an "and."

24. The program storage device of claim 19, wherein the user defined search string comprises search parameters and logical relationships between the search parameters.

* * * * *